United States Patent
Kofidis et al.

(10) Patent No.: US 7,959,340 B2
(45) Date of Patent: Jun. 14, 2011

(54) DEVICE FOR BACKLIGHTING A LIQUID-CRYSTAL DISPLAY FACILITY FOR A DISPLAY AND/OR CONTROL UNIT, IN PARTICULAR IN A HOUSEHOLD APPLIANCE

(75) Inventors: Georgios Kofidis, Nürnberg (DE);
Gerhard Mager, Cadolzburg (DE);
Bernhard Siegmar, Beucherling (DE)

(73) Assignee: BSH Bosch und Siemens Hausgeraete GmbH, Muenchen (DE)

( * ) Notice: Subject to any disclaimer, the term of this patent is extended or adjusted under 35 U.S.C. 154(b) by 258 days.

(21) Appl. No.: 12/279,661

(22) PCT Filed: Jan. 9, 2007

(86) PCT No.: PCT/EP2007/050199
§ 371 (c)(1),
(2), (4) Date: Oct. 14, 2008

(87) PCT Pub. No.: WO2007/093463
PCT Pub. Date: Aug. 23, 2007

(65) Prior Publication Data
US 2009/0059566 A1    Mar. 5, 2009

(30) Foreign Application Priority Data
Feb. 15, 2006  (DE) .................... 10 2006 007 065

(51) Int. Cl.
*G09F 9/35*   (2006.01)
(52) U.S. Cl. ........ 362/603; 362/602; 362/627; 362/628; 362/97.2

(58) Field of Classification Search .......... 362/600–633, 362/97.1, 97.2; 349/56–71
See application file for complete search history.

(56) References Cited

U.S. PATENT DOCUMENTS

| | | | |
|---|---|---|---|
| 3,264,769 A | 8/1966 | Hardesty | |
| 5,808,708 A * | 9/1998 | Oyama et al. | 349/65 |
| 5,956,107 A * | 9/1999 | Hashimoto et al. | 349/64 |
| 6,108,059 A * | 8/2000 | Yang | 349/65 |
| 6,199,989 B1 | 3/2001 | Maeda et al. | |
| 6,882,382 B2 * | 4/2005 | Son | 349/65 |
| 6,891,530 B2 * | 5/2005 | Umemoto et al. | 345/173 |
| 7,736,042 B2 * | 6/2010 | Park et al. | 362/602 |

FOREIGN PATENT DOCUMENTS

| | | |
|---|---|---|
| EP | 0997683 A1 | 5/2000 |
| EP | 1139013 A2 | 10/2001 |
| GB | 2410116 A | 7/2005 |

* cited by examiner

*Primary Examiner* — Anabel M Ton
(74) *Attorney, Agent, or Firm* — Laurence A. Greenberg; Werner H. Stemer; Ralph E. Locher

(57) ABSTRACT

The aim is to provide backlighting in a liquid-crystal display unit for a display and/or operator control unit, in particular on a domestic appliance. To achieve this, a backlighting layer, to which at least one backlighting source can be coupled, is located beneath an LCD layer and at least one supplementary backlighting layer is located beneath the backlighting layer. The supplementary layer can be coupled to at least one additional backlighting source assigned to the layers and permits the respective supplementary backlighting layer to emit light from the additional backlighting source(s) in respective defined masked zones through the backlighting layer and through the LCD layer.

14 Claims, 2 Drawing Sheets

DEVICE FOR BACKLIGHTING A LIQUID-CRYSTAL DISPLAY FACILITY FOR A DISPLAY AND/OR CONTROL UNIT, IN PARTICULAR IN A HOUSEHOLD APPLIANCE

BACKGROUND OF THE INVENTION

Field of the Invention

The present invention relates to a device for backlighting a liquid-crystal display facility for a display and/or control unit, in particular in a household appliance, with a backlighting layer, to which at least one backlight source can be coupled, arranged below a liquid-crystal display layer.

Devices for LCD backlighting are already generally known (see for example DE 102 52 630 A1, DE 699 12 233 T2, DE 20 2005 015 061 U1). These known devices are simply backlighting for large or whole areas of a liquid crystal display unit referred to here as an LCD unit. The respective background can therefore only be lit completely in one color. It is not possible to light individual background zones specifically in this manner.

A control and display unit for the differentiated color identification of texts or symbols with a monochrome LCD facility and a backlighting arrangement for the LCD facility has also already been proposed (DE 10 2004 063 593.5), with which a film is provided between the backlighting arrangement and the LCD facility, said film having a microstructure. By coupling a plurality of such films, which are arranged in different zones of the relevant control and display unit, to individual light sources, in particular to LEDs of differing colors, it is possible to light the relevant zones individually with corresponding backlighting. The relevant zones here are in particular zones, in which the LCD facility can make information visible further to corresponding activation. This information can therefore be viewed in front of the individual backlighting defined by the respective film. However in this instance too it is essentially only possible to have a surface-wide differentiated color identification of texts or symbols of a monochrome LCD facility.

There is increasingly a desire however with display and/or control units of devices, in particular household devices, fitted with LCD facilities, to backlight such LCD facilities not just over whole or large areas but also to backlight specific zones therein. The object of the invention is therefore to show a way in which at least one additional backlight can be provided in definable, geometrically separate zones for a device of the type mentioned in the introduction in a particularly simple but still effective manner.

BRIEF SUMMARY OF THE INVENTION

According to the invention the object set out above is achieved for a device of the type mentioned in the introduction in that at least one supplementary backlighting layer is arranged below the said one backlighting layer, it being possible to couple said supplementary backlighting layer to at least one further backlight source assigned to it, and in that the respective supplementary backlighting layer allows light from the at least one additional backlight source to be emitted in respectively defined masked zones through the said one backlighting layer and through the LCD layer.

The invention has the advantage that in an LCD facility containing the said one backlighting layer provision can be made with generally particularly little structural outlay for at least one supplementary backlight in definable, geometrically separate, in other words marked zones. If two or more supplementary backlighting layers are provided (preferably in what is known as a sandwich technique), these can be arranged adjacent to and/or below one another. The additional backlight sources assigned to and/or associated with the respective supplementary backlighting layers can also be arranged correspondingly adjacent to and/or below one another. It is hereby possible to operate with differing brightness and/or lighting colors, which is extremely beneficial for activation processes in electrical appliances and/or for user menus for program controllers or sequences in such appliances. The invention also prevents the display of defining separating lines between zones lit by supplementary backlighting and adjacent regions.

Expediently arranged between the said one backlighting layer and the respective supplementary backlighting layer is a cover mask formed and/or printed in such a manner that light from the respectively associated additional backlight source can only be emitted according to the light-permeable zones of the cover mask to the LCD layer and through this. It is therefore possible to operate with a cover mask that is relatively simple to produce for the respective supplementary backlighting layer, so that the light can be emitted from the additional backlight source associated with the respective supplementary backlighting layer into the respectively required zone.

The respective cover mask is preferably formed by covering the respective supplementary backlighting layer on the side facing the said one backlighting layer in zones removed from the additional backlighting, in particular with a dark color layer. In this instance the respective cover mask can be produced in a particularly simple manner and with particularly little structural outlay.

According to a further expedient embodiment of the present invention the said light-permeable zones have at least one line element and/or graphic sign and/or at least one legend. This allows the respective supplementary backlighting to be concentrated quite specifically on at least one line element and/or graphic character and/or at least one legend. Such backlighting is not at all possible with the known backlighting for large or whole areas examined in the introduction.

In order to allow one or more supplementary backlights in a particularly effective manner, the said one backlighting layer is preferably configured either as a combined light reflector and light diffuser or it is formed by a semi-permeable diffuser film.

To ensure the most uniform backlighting possible using the said one backlighting layer, a diffuser film or foil diffuser foil is expediently arranged between this and the LCD layer.

According to an even more expedient embodiment of the present invention the said one backlighting layer and the respective supplementary backlighting layer are formed respectively from a light-conducting plastic film. The respective plastic film preferably consists of polymethyl methacrylate (PMMA) or polycarbonate (PC). These plastics have been particularly proven as light-conducting plastics.

In order to prevent any over-exposure effects that may occur when deploying the respective supplementary backlighting layer and its associated additional backlight source outside the respectively defined zone, the respective supplementary backlighting layer can either be formed in the region of its respectively defined zone(s) as such an optical configuration or element or be combined in the beam path to the LCD layer with such an optical configuration or element, that practically parallel light beams can be emitted from the respectively associated additional backlight source through the respectively defined zone. A possible optical element in this context is for example a collimator lens or collimator arrangement. It is however also possible to deploy other optical configurations here, which produce the required beam bundling from the respective additional backlight source.

The present invention is described in more detail below based on exemplary embodiments with reference to the accompanying drawings, in which

DESCRIPTION OF THE INVENTION

Figure 1:
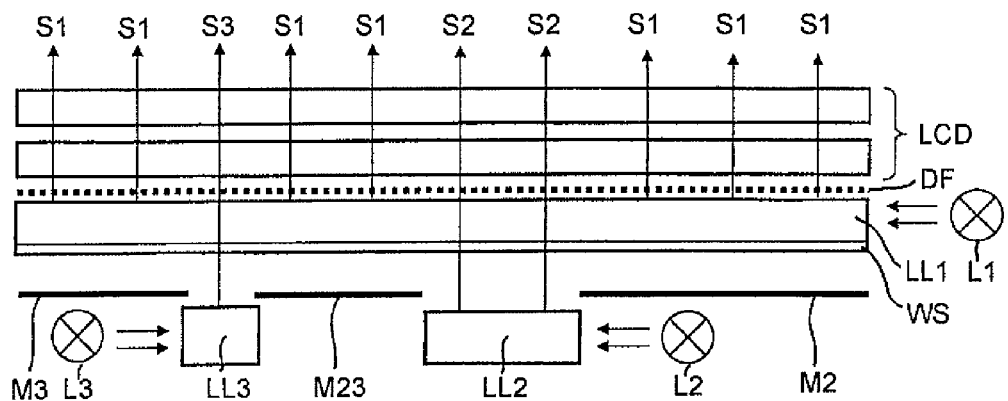
FIG. 1 shows a greatly enlarged schematic diagram of a first exemplary embodiment of an inventive device.

Before examining the inventive devices shown in the drawings and their modifications further, it should be noted that identical elements and facilities are shown with identical reference characters in all the figures.

The devices for backlighting a liquid crystal display or LCD facility for a display and/or control unit shown respectively in greatly enlarged schematic diagrams in FIGS. 1 to 4 respectively contain a liquid crystal display facility LCD, of which only a liquid crystal cell and polarization filter are shown. The relevant liquid crystal display facility LCD is already generally known and its structure does not have to be described in more detail here. It should be noted here however that the relevant LCD facility can generally be deployed in an appliance, in which a display unit and/or control unit has to be provided. In the case of a control unit, the LCD facility can be combined with additional control elements, for example touch keys (not shown in detail here). The respective device is preferably provided for a household appliance, which contains both a display unit and a control unit, e.g. an electric washing machine, an electric dryer, an electric dishwasher, etc.

Associated with the device shown in FIG. 1, in addition to the above-mentioned liquid crystal display facility LCD, is a backlighting layer LL1 arranged below this, to which at least one backlight source can be coupled. According to FIG. 1 only one such backlight source L1 is provided. The above-mentioned backlighting layer LL1 is preferably configured either as a combined light reflector and light diffuser, which allows the most uniform backlight possible to be emitted in the form of light beams S1 to the liquid crystal display unit LCD and through this or the relevant backlighting layer LL1 is formed by a semi-permeable diffuser film. In the first-mentioned instance the relevant backlighting layer LL1 is expediently covered completely with color on its lower face, in particular with a white color layer WS—when a backlight source L1 emitting white light is used. The light emitted by the backlight source L1 is directed, as shown in FIG. 1, in a transverse direction into the backlighting layer LL1. A diffuser film DF is provided on the side facing the liquid crystal display facility LCD above the above-mentioned backlighting layer LL1, it being possible also to apply said diffuser film DF optionally to the backlighting layer LL1.

The above-mentioned device structure allows practically uniform backlighting of the entire liquid crystal display facility LCD by means of the above-mentioned light beams S1.

The further measures described below however take into account the desire expressed in the introduction to backlight not just whole or large areas of the relevant liquid crystal display facility LCD but also to backlight certain zones in a specific manner. To this end in the first exemplary embodiment illustrated in FIG. 1 two supplementary backlighting layers LL2 and LL3 are arranged below the one backlighting layer LL1 looked at before and adjacent to one another and can be coupled to a respectively assigned backlight source L2 or L3. The contours of these two backlighting layers LL2 and LL3 are also not visible from outside when not activated.

The two supplementary backlighting layers LL2 and LL3 allow light from their assigned backlight source L2 and L3 respectively to be emitted in respectively defined masked zones and/or lighting zones through the said one backlighting layer LL1 and through the liquid display facility LCD. This light is shown in FIG. 1 by two light beams S2 in relation to the backlight source L2 and by one light beam L3 in relation to the additional backlight source L3. The masking mentioned above is achieved in that arranged between the said one backlighting layer LL1 and the respective supplementary backlighting layer LL2, LL3 is a cover mask—shown in FIG. 1 with the optionally contiguous mask elements M2, M3 and M23—formed and/or printed in such a manner that light from the respectively associated additional backlight source L2 and/or L3 can only be emitted according to the light-permeable zones of the relevant cover mask to the liquid crystal display facility LCD and through this. The relevant light-permeable zones and/or supplementary lighting zones can moreover be freely positioned and be configured with freely definable geometric forms. This moreover allows a parallax-free display of the respective light-permeable zones and/or supplementary lighting zones, in particular when using backlighting layers of reduced thickness.

The respective cover mask, which according to FIG. 1 consists of the above-mentioned mask elements M2, M3 and M23, is expediently formed so that the respective supplementary backlighting layer LL2 and LL3 in FIG. 1 is covered on the side facing the said one backlighting layer LL1 in zones removed for the additional backlighting, in particular with a dark color layer. The relevant cover mask and/or its individual, preferably contiguous, cover mask elements M2, M3 and M23 can moreover be connected to the lower face of the arrangement shown in FIG. 1, comprising the backlighting layer LL1 and its color cover layer WS, for example by imprinting.

The light-permeable zones in the cover mask, in other words the regions between the mask elements M2 and M23 on the one hand and between the mask elements M3 and M23 on the other hand in FIG. 1, preferably comprise at least one line element and/or graphic sign and/or at least one legend. This allows quite specifically defined geometrically separate zones to be lit with at least one supplementary backlight according to the present invention. This supplementary backlight can be for example in the same color as the backlight through the said one backlighting layer LL1. In this instance the zones lit thus by the supplementary backlight are lighter than their surroundings. It is of course also possible however for the respective supplementary backlighting to be provided in a different color from that emitted by the backlighting layer LL1 according to FIG. 1.

The device shown in FIG. 2 according to a second exemplary embodiment of the invention differs from the device shown in FIG. 1 essentially only in that two supplementary backlighting facilities are provided, which are arranged not adjacent to one another but below one another below the backlighting layer LL1 mentioned above in conjunction with the device shown in FIG. 1. It should be sufficient here just to look more closely at the features which distinguish the device according to FIG. 2 from the device according to FIG. 1.

Figure 2:
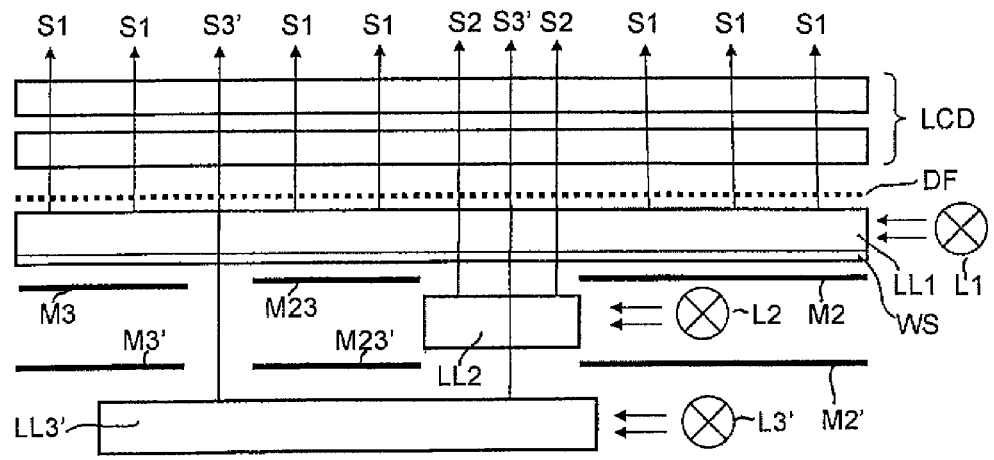
FIG. 2 shows a greatly enlarged schematic diagram of a second exemplary embodiment of an inventive device.

According to FIG. 2 the one supplementary backlighting arrangement comprises the supplementary backlighting layer LL2 already examined in conjunction with FIG. 1 and its associated additional backlight source L2. Between this supplementary backlighting layer LL2 and its associated backlight source L2 on the one hand and the lower face of the cover layer WS of the one backlighting layer LL1 according to FIG. 2 the cover mask elements M2, M3 and M23 already described in conjunction with FIG. 1 are provided in practically the same relative position to one another. In the present instance light beams S2 are emitted from the supplementary backlighting layer LL2, as also in FIG. 1, toward the upper face of the liquid crystal display facility LCD.

In the case of the device shown in FIG. 2 a further supplementary backlighting layer LL3' with an assigned additional backlight source L3' is arranged below the previously examined supplementary backlighting layer LL2 and its assigned backlight source L2. Between the supplementary backlighting layer LL2 and its assigned backlight source L2 on the one hand and the further additional backlighting layer LL3' and its assigned backlight source L3' on the other hand a separate cover mask is provided, which according to FIG. 2 consists of the optionally likewise contiguous cover mask elements M2', M3' and M23'. In the present instance the spatial extension and position of these cover mask elements M2', M3' and M23' correspond to those of the previously examined cover masks M2, M3 and M23. This means that the supplementary backlighting layer LL3' emits light beams S3' toward the upper face of the liquid crystal display facility LCD, as shown in FIG. 2.

The light emission from the supplementary backlighting layer LL3' through the intermediate spaces between the cover mask elements M3 and M23 and between the cover mask elements M3' and M23' corresponds to the light emission from the supplementary backlighting layer LL3 shown in FIG. 1. It should be noted here that one of these two pairs of cover mask elements could be omitted here if desired. The light emission from the supplementary backlighting layer LL3' according to FIG. 2 in the region of the supplementary backlighting layer LL2 shown there in the meantime means that a further supplementary light emission with the light beam S3' shown in the center region in FIG. 2 can be added to the supplementary light emission by means of the two light beams S2 shown. This above-mentioned light beam S3' can be formed by the cover mask elements M2' and M23' quite specifically, for example in the form of at least one line element or graphic sign or at least one legend, with which for example a specific supplementary message can be output outward through the liquid crystal display facility LCD, for example a warning. The backlight emitted from the additional backlight source L3' here can be of a different color from the backlight emitted from the additional backlight source L2. Thus for example the backlight source L1 associated with or assigned to the backlighting layer LL1 can emit white light and the additional backlight source L2 assigned to or associated with the supplementary backlighting layer LL2 can emit yellow light. The backlight source L3' associated with or assigned to the supplementary backlighting layer LL3' can for example emit red light.

Figure 3:
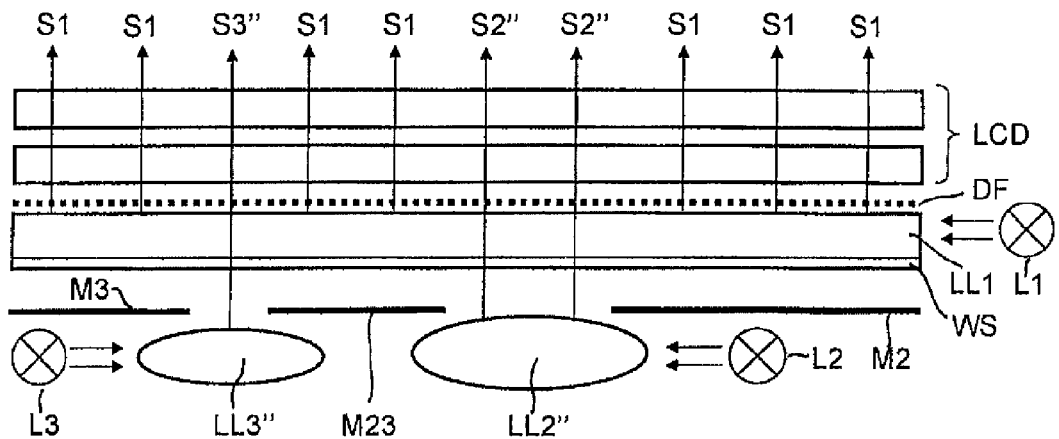
FIG. 3 shows a modification of the inventive device shown in FIG. 1.

FIG. 3 shows a modification of the exemplary embodiment of an inventive device shown in FIG. 1. The relevant modification consists of replacing the two supplementary backlighting layers LL2 and LL3 provided in the exemplary embodiment according to FIG. 1 respectively with an optical configuration in the form of a collimator lens LL2" and/or LL3". The remaining structure of the device shown in FIG. 3 corresponds completely to the structure of the device shown in FIG. 1, so only the two collimator lenses LL2" and LL3" will be examined here.

The collimator lenses LL2" and LL3" represent any optical configuration, which results in such beam bundling of the light beams emitted from the respective associated backlight source L2 and/or L3 that practically parallel light beams are emitted toward the upper face of the liquid crystal display facility LCD in the form of light beams S2" and/or S3" in the lighting zone respectively defined by the associated cover mask elements. As mentioned above, it is thus relatively easy to prevent so-called over-exposure effects, which may occur between the zones lit respectively by the additional backlighting sources L2 and/or L3 in the display field of the liquid crystal display facility LCD.

Figure 4:
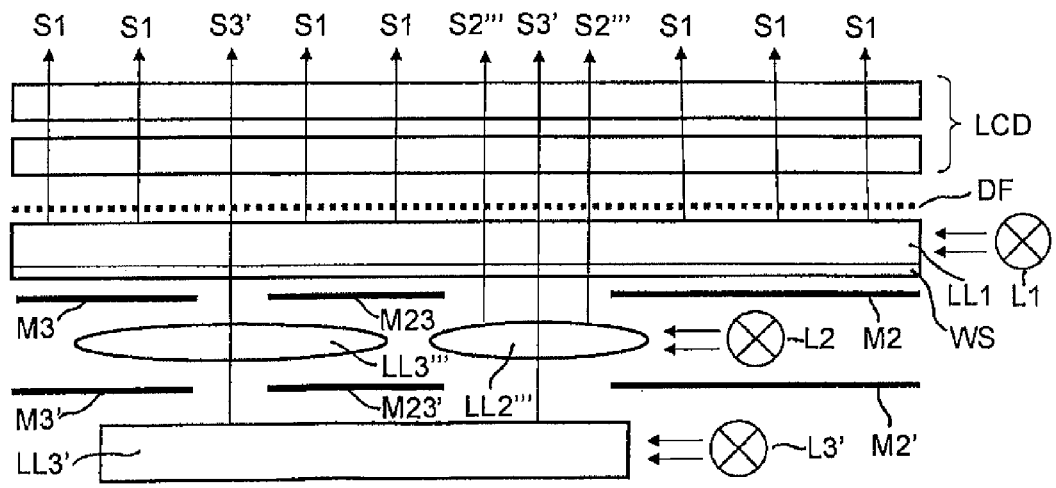
FIG. 4 shows a modification of the inventive device shown in FIG. 2.

FIG. 4 shows a modification of the exemplary embodiment of an inventive device shown in FIG. 2. In contrast to the inventive device shown in FIG. 2, in the device shown in FIG. 4 the supplementary backlighting layer LL2 provided in FIG. 2 is replaced by an optical configuration LL2''' shown as a collimator lens. Because of the lighting from its associated backlight source L2 this collimator lens LL2''' emits light beams S2''' to the upper face of the liquid crystal display facility LCD shown in FIG. 4. The relevant collimator lens LL2''' also emits light in the form of a light beam L3', said light or light beam L3' being emitted from the supplementary backlighting layer LL3' according to FIG. 4.

Compared with the second exemplary embodiment of an inventive device shown in FIG. 2, in the modification of this embodiment shown in FIG. 4 in the beam path shown in the left region, in which light beams S3' are emitted from the supplementary backlighting layer LL3', an optical configuration in the form of a collimator lens LL3''' is arranged between the mask elements M3, M23 on the one hand and the mask elements M3', M23' on the other hand. This collimator lens LL3''' acts in respect of the light beams emitted from the supplementary backlighting layer LL3' in the same manner as each of the collimator lenses LL2" and LL3" used instead of supplementary backlighting layers with the device shown in FIG. 3 and like the collimator lens LL2''' shown in FIG. 4.

In the modifications of the inventive devices shown in FIGS. 1 and 2 the light injection into the collimator lenses LL2", LL3" and LL2''' from the respectively associated backlight source L2 and/or L3 is shown respectively in one direction across the optical main lens axis. It should be immediately evident that the light injection from the respectively associated backlight source can of course also take place along the respective optical main lens axis, as shown in FIG. 4 in respect of the collimator lens LL3'''.

Two exemplary embodiments of the inventive device and one modification of each of these devices have been described above based on the schematic diagrams in the figures. It should be evident that during the practical execution of the present invention various additional light shielding measures can be taken between the different regions of the device. Thus for example such a shielding measure can be provided for between the individual supplementary backlighting layers according to FIG. 1 and between the individual collimator lenses according to FIGS. 3 and 4.

Moreover the positions in which the individual light sources are arranged can be different from the positions shown in FIGS. 1 to 4. Also a wide range of very different light sources can be used as backlight sources, being able to emit light of different colors or even combined colors, for example incandescent lamps, LEDs, organic LEDs (O-LED), cold cathode tubes (CCFL), electroluminescent and/or luminous films, etc. Possible materials for the backlighting layers are preferably light-conducting plastics known for short as optical waveguides. Polymethyl methacrylate (PMMA) and polycarbonate (PC) have proven particularly suitable here. The collimator lenses mentioned are also preferably made of such materials. The respective upper and/or lower face of these materials is expediently provided with a microstructure to extract light and improve homogeneity.

LIST OF REFERENCE CHARACTERS

DF Diffuser film or foil
LCD LCD or liquid crystal display facility
L1, L2, L3, L3' Backlight source(s)
LL1 Backlighting layer
LL2, LL2'', LL2''', LL3, Supplementary backlighting layer
LL3', LL3'', LL3'''
M2, M3, M23 Cover mask element(s)
M2', M3', M23'
S1, S2, S2'', S2''', S3, Light beam and/or light beams
S3', S3''
WS White color layer

The invention claimed is:

1. A device for backlighting an LCD unit for at least one of a display and a control unit, the device comprising:
a backlighting layer disposed below an LCD layer of the LCD unit;
at least one backlight source coupled to said backlighting layer;
at least one supplementary backlighting layer disposed below said backlighting layer;
at least one further backlight source coupled to said supplementary backlighting layer, said supplementary backlighting layer allowing light from said at least one further backlight source to be emitted through said backlighting layer and through the LCD layer; and
a cover mask having light-permeable zones and disposed between said backlighting layer and said supplementary backlighting layer, said cover mask defining masked zones and is at least one of formed and printed such that light from said further backlight source can only be emitted according to said light-permeable zones of said cover mask to the LCD layer;
said light-permeable zones of said cover mask defining geometrically separate zones to be lit on the LCD unit by the further backlight source.

2. The device according to claim 1, wherein said cover mask is formed so that said supplementary backlighting layer is covered on a side facing said backlighting layer in zones for not allowing additional backlighting.

3. The device according to claim 1, wherein said light-permeable zones include at least one geographic form selected from the group consisting of a line element, a graphic sign and a legend.

4. The device according to claim 1, wherein said backlighting layer is configured as one of a combined light reflector and light diffuser and a semi-permeable diffuser film.

5. The device according to claim 4, wherein said backlighting layer has a lower face coated completely with a color.

6. The device according to claim 4, further comprising a diffuser film disposed between said backlighting layer and the LCD layer.

7. The device according to claim 1, wherein said backlighting layer and said supplementary backlighting layer are formed respectively from a light-conducting plastic film.

8. The device according to claim 7, wherein said light-conducting plastic film is formed of a material selected from the group consisting of polymethyl methacrylate and polycarbonate.

9. The device according to claim 1, wherein in a region of said light-permeable zones said supplementary backlighting layer is formed as an optical configuration and parallel light beams can be emitted through said light-permeable zones from said further backlight source.

10. The device according to claim 1, wherein the device is used in a household appliance.

11. The device according to claim 2, wherein said cover mask is a dark color layer disposed on said side of said supplementary backlighting layer facing said backlighting layer.

12. The device according to claim 4, wherein said backlighting layer has a lower face coated completely with a white color.

13. The device according to claim 1, further comprising an optical configuration, and in a region of said light-permeable zones said supplementary backlighting layer is combined in a beam path to the LCD layer with said optical configuration such that parallel light beams can be emitted through said light-permeable zones from said further backlight source.

14. The device according to claim 1, wherein said light-permeable zones of said cover mask form the light from said at least one further backlight source into at least one geographic form selected from the group consisting of a line element, a graphic sign and a legend.

* * * * *